United States Patent
Ko et al.

(10) Patent No.: US 11,783,460 B2
(45) Date of Patent: Oct. 10, 2023

(54) APPARATUS AND METHOD FOR OPTIMIZING INVERSE TONE MAPPING ON BASIS OF SINGLE IMAGE, AND RECORDING MEDIUM FOR PERFORMING METHOD

(71) Applicant: Korea University Research and Business Foundation, Seoul (KR)

(72) Inventors: Sung Jea Ko, Seoul (KR); Kwanghyun Uhm, Seoul (KR); Sungjin Cho, Seongnam-si (KR); Hyongkeun Kook, Seoul (KR); Seungwook Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 262 days.

(21) Appl. No.: 17/298,712

(22) PCT Filed: Jan. 28, 2019

(86) PCT No.: PCT/KR2019/001177
§ 371 (c)(1),
(2) Date: Jun. 23, 2021

(87) PCT Pub. No.: WO2020/111382
PCT Pub. Date: Jun. 4, 2020

(65) Prior Publication Data
US 2022/0051376 A1 Feb. 17, 2022

(30) Foreign Application Priority Data
Nov. 30, 2018 (KR) .................. 10-2018-0151963

(51) Int. Cl.
*G06T 5/00* (2006.01)
*G06T 3/40* (2006.01)
*G06T 5/20* (2006.01)

(52) U.S. Cl.
CPC ............. *G06T 5/009* (2013.01); *G06T 3/40* (2013.01); *G06T 5/002* (2013.01); *G06T 5/20* (2013.01);
(Continued)

(58) Field of Classification Search
CPC ........... G06T 5/009; G06T 3/40; G06T 5/002; G06T 5/20; G06T 2207/20028;
(Continued)

(56) References Cited

U.S. PATENT DOCUMENTS

| | | | |
|---|---|---|---|
| 7,426,312 B2 * | 9/2008 | Dance | G06T 5/40 |
| | | | 382/254 |
| 8,184,693 B2 * | 5/2012 | Chiu | H04N 19/30 |
| | | | 375/240.02 |

(Continued)

OTHER PUBLICATIONS

Granados, Miguel, et al. "HDR image noise estimation for denoising tone mapped images." Proceedings of the 12th European Conference on Visual Media Production. 2015. (Year: 2015).*

(Continued)

*Primary Examiner* — Andrae S Allison
(74) *Attorney, Agent, or Firm* — NSIP Law

(57) ABSTRACT

The present disclosure relates to an apparatus and method for optimizing inverse tone mapping on basis of a single image to reconstruct into a high quality High Dynamic Range (HDR) image using a Low Dynamic Range (LDR) image and a recording medium for performing the method, and includes inputting a LDR image to Inverse Tone Mapping (ITM) operator, inputting a result value by the ITM operator to Tone Mapping (TM) operator, comparing a result value by the TM operator with a threshold for HDR luminance determination, and selecting the result value by the TM operator which is smaller than the threshold as an HDR image.

14 Claims, 8 Drawing Sheets

(52) U.S. Cl.
 CPC ............... *G06T 2207/20028* (2013.01); *G06T 2207/20208* (2013.01); *G06T 2207/20224* (2013.01)

(58) Field of Classification Search
 CPC . G06T 2207/20208; G06T 2207/20224; G06T 2207/10024; G06T 2207/20076; G06T 5/007; G06T 5/30
 See application file for complete search history.

(56) References Cited

U.S. PATENT DOCUMENTS

| | | | |
|---|---|---|---|
| 9,911,181 B2* | 3/2018 | Pouli | ........................ G06T 5/007 |
| 2012/0201456 A1* | 8/2012 | El-Mahdy | ............ H04N 23/741 |
| | | | 382/167 |
| 2016/0358319 A1 | 12/2016 | Xu et al. | |
| 2017/0061592 A1* | 3/2017 | Reinhard | .................. G06T 7/13 |
| 2017/0244980 A1* | 8/2017 | Monnier | .............. H04N 19/593 |
| 2018/0115742 A1 | 4/2018 | Guermoud et al. | |
| 2018/0260942 A1 | 9/2018 | Jolly et al. | |
| 2019/0141321 A1* | 5/2019 | Yin | ...................... H04N 19/136 |

OTHER PUBLICATIONS

Huo, Yongqing, and Xudong Zhang. "Single image-based HDR image generation with camera response function estimation." IET Image Processing 11.12 (2017): 1317-1324. (Year: 2017).*

Banterle, Francesco et al., "Inverse Tone Mapping", *Proceedings of the 4th international conference on Computer graphics and interactive techniques in Australasia and Southeast Asia*. Nov. 29-Dec. 2, 2006.

International Search Report dated Aug. 28, 2019 in counterpart International Patent Application No. PCT/KR2019/001177 (2 pages in English and 2 pages in Korean).

* cited by examiner

APPARATUS AND METHOD FOR OPTIMIZING INVERSE TONE MAPPING ON BASIS OF SINGLE IMAGE, AND RECORDING MEDIUM FOR PERFORMING METHOD

CROSS REFERENCE TO RELATED APPLICATIONS

This application is a U.S. National Stage Application of International Application No. PCT/KR2019/001177, filed on Jan. 28, 2019, which claims the benefit under 35 USC 119(a) and 365(b) of Korean Patent Application No. 10-2018-0151963, filed on Nov. 30, 2018, in the Korean Intellectual Property Office, the entire disclosure of which is incorporated herein by reference for all purposes.

TECHNICAL FIELD

The present disclosure relates to an apparatus and method for optimizing inverse tone mapping on basis of a single image and a recording medium for performing the method, and more particularly, to an apparatus and method for optimizing inverse tone mapping on basis of a single image to reconstruct into a high quality High Dynamic Range (HDR) image using a Low Dynamic Range (LDR) image and a recording medium for performing the method.

BACKGROUND ART

In recent years, High Dynamic Range (HDR) displays have been rapidly developed due to rich visual experience. Accordingly, a variety of inverse tone mapping (ITM) methods have been proposed to display Low Dynamic Range (LDR) images on the HDR displays, and these ITM methods have been aimed at enhancing the contrast and brightness of the LDR images without introducing visual artifacts.

To expand the contrast range of the LDM images, the ITM methods use linear mapping, gamma correction and LDR-HDR mapping function which is the approximate inverse version of the tone mapping (TM) function.

Since the quality of HDR images reconstructed from the LDR images greatly depends on the presence of unstable spatial artifacts, the major issue during image reconstruction is to maintain the key features of the original images while preserving the entire structure.

However, the LDR-HDR mapping function used in the existing ITM methods expands only the contrast range of the LDR images without the limitation that the reconstructed HDR images should preserve at least the important functions and the entire structure of the input LDR images, and thus these methods tend to generate low quality HDR images having contrast loss and distortion.

Since the quality of the HDR images reconstructed from the LDR images greatly depends on the presence of unstable spatial artifacts, the major issue in the image reconstruction is to maintain the key features of the original images while the preserving the entire image structure.

However, the LDR-HDR mapping function used in the existing ITM methods expands only the contrast range of the LDR images without constraint that the reconstructed HDR images should preserve at least the important functions and the entire structure of the input LDR images, and thus these methods generate low quality HDR images having contrast loss and distortion.

The above-described background art is technical information that the inventor knows to devise the invention or acquired in the process of devising the invention, and it cannot be said that such information is well-known and published to the public before filing the patent application.

DISCLOSURE

Technical Problem

An aspect of the present disclosure provides an apparatus and method for optimizing inverse tone mapping on basis of a single image to provide a new inverse tone mapping (ITM) optimization framework under the assumption that an input Low Dynamic Range (LDR) image is similar to an LDR image acquired by tone mapping a real High Dynamic Range (HDR) image, and a recording medium for performing the method.

Additionally, there are provided an apparatus and method for optimizing inverse tone mapping on basis of a single image, in which an HDR image is initially reconstructed by applying the conventional tone mapping function in a reverse manner, and the reconstructed HDR image is iteratively modified toward an optimal HDR image by minimizing a difference between the input LDR image and the tone mapped LDR image acquired from the reconstructed HDR image, and a recording medium for performing the method.

The technical problem of the present disclosure is not limited to the above-mentioned technical problem, and other technical problems not mentioned herein will be clearly understood by those skilled in the art from the following description.

Technical Solution

A method for optimizing inverse tone mapping on basis of a single image according to an embodiment of the present disclosure includes inputting a Low Dynamic Range (LDR) image to Inverse Tone Mapping (ITM) operator, inputting a result value by the ITM operator to Tone Mapping (TM) operator, comparing a result value by the TM operator with a threshold for HDR luminance determination, and selecting the result value by the TM operator which is smaller than the threshold as a High Dynamic Range (HDR) Image.

In an embodiment, the method for optimizing inverse tone mapping on basis of a single image according to an embodiment of the present disclosure may further include acquiring an updated predicted value by calculating $i+1^{th}$ HDR luminance when the result value by the TM operator is equal to or larger than the threshold in the step of comparing with the threshold.

In an embodiment, in the method for optimizing inverse tone mapping on basis of a single image according to an embodiment of the present disclosure, when a difference value for all pixels at $i^{th}$ iteration of a result value acquired in the step of acquiring the updated predicted value is equal to or larger than 0, the difference value may be substituted into an input value of the step of selecting as the HDR image.

In an embodiment, in the method for optimizing inverse tone mapping on basis of a single image according to an embodiment of the present disclosure, when a difference value for all pixels at $i^{th}$ iteration of a result value acquired in the step of acquiring the updated predicted value is smaller than 0 and a difference value at $i+1^{th}$ iteration is equal to or larger than 1, the difference value may be substituted into an input value of the step of inputting to the TM operator.

In an embodiment, in the method for optimizing inverse tone mapping on basis of a single image according to an embodiment of the present disclosure, when a difference value for all pixels at $i^{th}$ iteration of a result value acquired in the step of acquiring the updated predicted value is smaller than 0 and a difference value at $i+1^{th}$ iteration is smaller than 1, a luminance value at the $i+1^{th}$ iteration may be substituted into an input value of the step of selecting as the HDR image.

In an embodiment, the method for optimizing inverse tone mapping on basis of a single image according to an embodiment of the present disclosure may further include enhancing a high luminance region of the image selected in the step of selecting as the HDR image.

In an embodiment, enhancing the high luminance region may include detecting the high luminance region of the input LDR image having a larger luminance value of a pixel than the threshold for overexposure determination, and processing the input LDR image having the detected high luminance region.

In an embodiment, detecting the high luminance region may include smoothing the detected high luminance region using a cross bilateral filter.

In an embodiment, in the method for optimizing inverse tone mapping on basis of a single image according to an embodiment of the present disclosure, a pixel value of the high luminance region may be acquired by scaling an input value of the HDR image according to the smoothed high luminance region.

In an embodiment, processing the input LDR image may include acquiring a smoothed high luminance region, scaling the acquired smoothed high luminance region, and acquiring an output HDR image using the scaled high luminance region.

In an embodiment, acquiring the smoothed high luminance region may include acquiring the smoothed high luminance region (M(p)) by calculating at each location p by the following equation:

$$M(p) = \frac{1}{W(p)} \sum_{q \in N(p)} \exp\left(-\frac{\|r-q\|^2}{\sigma_s^2}\right) \exp\left(-\frac{\|L(p)-L(q)\|^2}{\sigma_r^2}\right) S(q) \text{ where } W(p) = \sum_{q \in N(p)} \exp\left(-\frac{\|p-q\|^2}{\sigma_s^2}\right) \exp\left(-\frac{\|L(p)-L(q)\|^2}{\sigma_r^2}\right),$$

$\sigma_s$ is a standard deviation used to calculate a space (luminance) weight, $\sigma_r$ is a standard deviation used to calculate a range (luminance) weight, and N(p) is a neighborhood of p.

In an embodiment, the scaling may include scaling the smoothed high luminance region (M(p)) acquired in the step of acquiring the smoothed high luminance region to a range [1 to α] using the following equation:

$$\tilde{M}(p) = 1 + \frac{M(p) - M_{min}}{M\text{min}_{max}(\alpha - 1)}$$

where $\tilde{M}_p$ is a scaled value of the smoothed high luminance region (M) at location p, $M_{min}$ is a maximum value of the smoothed high luminance region, and $M\text{min}_{max}$ is a minimum value of the smoothed high luminance region.

In an embodiment, acquiring the output HDR image may include acquiring the output HDR image by pixel-by-pixel multiplication of the HDR image ($L^*_H$) and a scaled value ($\tilde{M}(p)$) of the smoothed high luminance region.

A computer-readable recording medium according to another embodiment of the present disclosure has recorded thereon a computer program for performing the method for optimizing inverse tone mapping on basis of a single image.

An apparatus for optimizing inverse tone mapping on basis of a single image according to an embodiment of the present disclosure includes an ITM computation unit to input a LDR image to ITM Operator, a TM computation unit to input a result value by the ITM computation unit to TM operator, a threshold comparison unit to compare a result value by the TM computation unit with a threshold for HDR luminance determination, and an HDR image selection unit to select the result value by the TM computation unit as an HDR image when it is determined by the threshold comparison unit that the result value by the TM computation unit is smaller than the threshold.

Advantageous Effects

According to an aspect of the present disclosure described above, it is possible to effectively reconstruct high quality High Dynamic Range (HDR) images by enhancing the existing inverse tone mapping (ITM) methods involving contrast distortion such as contrast loss and contrast reversal in reconstructed HDR images, thereby providing significantly enhanced performance in terms of objective quality compared to the other existing methods.

BEST MODE

Figure 1:
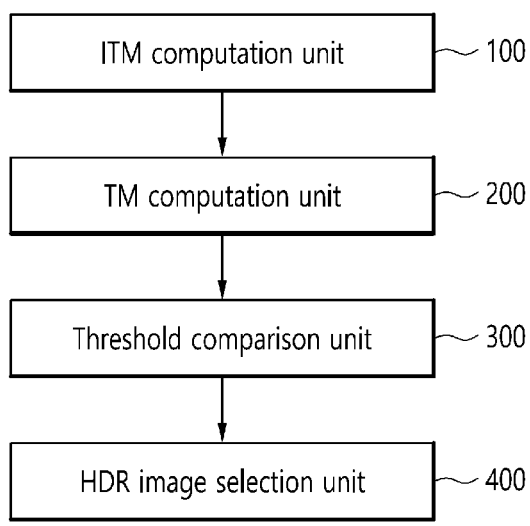
FIG. 1 is a diagram showing a schematic configuration of an apparatus for optimizing inverse tone mapping on basis of a single image according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be incorporated into other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

Prior to description of the present disclosure, Tone Mapping (TM) and Inverse Tone Mapping (ITM) operators will be described.

The present disclosure is designed to acquire an optimal High Dynamic Range (HDR) image using TM operator and inverse version, and needs different and reversible TM operator.

Accordingly, the present disclosure adopts Reinhard's TM operator (E. Reinhard, M. Stark, P. Shirley, J. Ferwerda, Photographic tone reproduction for digital images, ACM transactions on graphics (TOG) 21 (3) (2002) 267-276) which is the commonly used global TM operator, and the inverse transform of Reinhard's TM operator has been thoroughly researched (F. Banterle, P. Ledda, K. Debattista, A. Chalmers, M. Bloj, A framework for inverse tone mapping, The Visual Computer 23 (7) (2007) 467-478). The Reinhard's TM operator shows better performance than other global TM operators in terms of preserving details (Y. Salih, A. Malik, N. Saad, Tone mapping of hdr images: A review, in: Intelligent and Advanced Systems (ICIAS), 2012 4th International Conference on, Vol. 1, IEEE, 2012, pp. 368-373) and all differentiable and reversible TM operators may be applied to the framework of the present disclosure without losing universality.

Hereinafter, Reinhard's TM operator and the corresponding ITM operator will be described.

First, $L_H(x,y)$ in which H×W input takes an HDR image $L_H(x,y) \in [L_H^{min}, L_H^{max}]$ is considered. Here, $L_H^{min}$ and $L_H^{max}$ are the minimum and maximum luminance values of the input HDR image.

The design of Reinhard's TM operator is based on a conceptual framework of photographic technique, known as zone system which controls the final shape of photography (J. McCann, The ansel adams zone system: Hdr capture and range compression by chemical processing, in: Human Vision and Electronic Imaging XV, Vol. 7527, International Society for Optics and Photonics, 2010, p. 75270S).

To preserve the unique characteristics of the input HDR image such as texture and details in a tone mapped Low Dynamic Range (LDR) image, luminance of the input HDR image $L_H$ at each pixel (x, y) is linearly scaled as shown in the following Equation 1 (E. Reinhard, M. Stark, P. Shirley, J. Ferwerda, Photographic tone reproduction for digital images, ACM transactions on graphics (TOG) 21 (3) (2002) 267-276).

$$\tilde{L}_H(x, y) = \frac{\alpha}{\overline{L}_H} L_H(x, y) \quad \text{[Equation 1]}$$

Here, $\tilde{L}_H$ is the linearly scaled HDR image, α is the key value of the scaled HDR image, and $\overline{L}_H$ is the log average luminance of the given HDR image.

$$\overline{L}_H = \exp\left(\frac{1}{N}\sum_{x,y} \log(\varepsilon + L_H(x, y))\right) \quad \text{[Equation 2]}$$

Here, N=H×W, ε is a small value to avoid specificity, and the key value α of Equation 1 is estimated as shown in the following Equation 3 (E. Reinhard, Parameter estimation for photographic tone reproduction, Journal of graphics tools 7 (1) (2002) 45-51).

$$\alpha = 0.18 \times 4^{\left(\frac{2\log_3 \overline{L}_H - \log_3 L_H^{min} - \log_2 L_H^{max}}{\log_3 L_H^{max} - \log_2 L_H^{min}}\right)} \quad \text{[Equation 3]}$$

Subsequently, the tone mapped LDR image $L_d$ from the scaled HDR image $\tilde{L}_H$ is calculated as shown in the following Equation 4.

$$L_d(x, y) = \frac{\tilde{L}_H(x, y)\left(1 + \frac{\tilde{L}_H(x, y)}{L_{white}^2}\right)}{1 + \tilde{L}_H(x, y)} \quad \text{[Equation 4]}$$

Here, $L_{white}$ denotes the minimum luminance value of the HDR image mapped to pure white, and for example, is 255 for 8-bit tone mapping LDR image.

When $\tilde{L}_H(x,y)$ is larger than $L_{white}$, $L_d(x,y)$ is 255.

Reinhard's TM function f(·) may be defined as the following Equation 5 when Equation 1 is substituted into Equation 4.

$$f(L_H(x, y)) = \frac{\alpha L_H(x, y)\left(1 + \frac{2}{L_{white}^2} \cdot \frac{\alpha L_H(x, y)}{\overline{L}_H}\right)}{\overline{L}_H + \alpha L_H(x, y)} \quad \text{[Equation 5]}$$

Using Equation 5, ITM function g(·) may be induced as below (F. Banterle, P. Ledda, K. Debattista, A. Chalmers, M. Bloj, A framework for inverse tone mapping, The Visual Computer 23 (7) (2007) 467-478).

$$g(L_L(x, y)) = \quad \text{[Equation 6]}$$

$$\frac{L_H^{max_{white}}}{2\left((L_L(x, y) - 1) + \sqrt{(1 - L_L(x, y))^2 + \frac{4L_L(x, y)}{L_{white}^2}}\right)}$$

Here, $L_L$ is luminance of the input LDR image, and $\tilde{L}_H^{max}$ a is the maximum luminance value of the generated HDR image. In the case of ITM, $L_{white}$ determines the curvature of g(·).

FIG. 1 is a diagram showing a schematic configuration of an apparatus for optimizing inverse tone mapping on basis of a single image according to an embodiment of the present disclosure.

Referring to FIG. 1, the apparatus 10 for optimizing inverse tone mapping on basis of a single image according to an embodiment of the present disclosure includes an ITM computation unit 100, a TM computation unit 200, a threshold comparison unit 300 and an HDR image selection unit 400.

The ITM computation unit 100 inputs a Low Dynamic Range (LDR) image to Inverse Tone Mapping (ITM) Operator, and transmits a result value for the input to the TM computation unit 200.

The TM computation unit 200 inputs the result value by the ITM computation unit 100 to Tone Mapping (TM) operator, and transmits a result value for the input to the threshold comparison unit 300.

The threshold comparison unit 300 compares the result value by the TM computation unit 200 with a threshold for HDR luminance determination, and transmits a result value as a result of comparison to the HDR image selection unit 400.

The HDR image selection unit 400 selects the result value by the TM computation unit 200 as a High Dynamic Range (HDR) image when it is determined by the threshold comparison unit 300 that the result value by the TM computation unit 200 is smaller than the threshold.

The apparatus 10 for optimizing inverse tone mapping on basis of a single image having the above-described configuration may provide an ITM method for reconstructing an HDR image by minimizing a difference between an input LDR image and a tone mapped LDR image from the reconstructed HDR image.

Additionally, the apparatus 10 for optimizing inverse tone mapping on basis of a single image having the above-described configuration further enhances saturated regions of the reconstructed HDR image using a cross bilateral filter, the DRIM results may show more CA, CL and CR in the HDR image reconstructed by the proposed method than HDR images reconstructed by the other methods, and the tone mapped LDR image may have better visual quality than the existing method in terms of detail preservation and global contrast.

The apparatus 10 for optimizing inverse tone mapping on basis of a single image having the above-described configuration may execute or create a variety of software based on an Operating System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

A method for optimizing inverse tone mapping by each component of the apparatus 10 for optimizing inverse tone mapping on basis of a single image having the above-described configuration will be described in the following description of FIG. 2 and the subsequent drawings.

Figure 2:
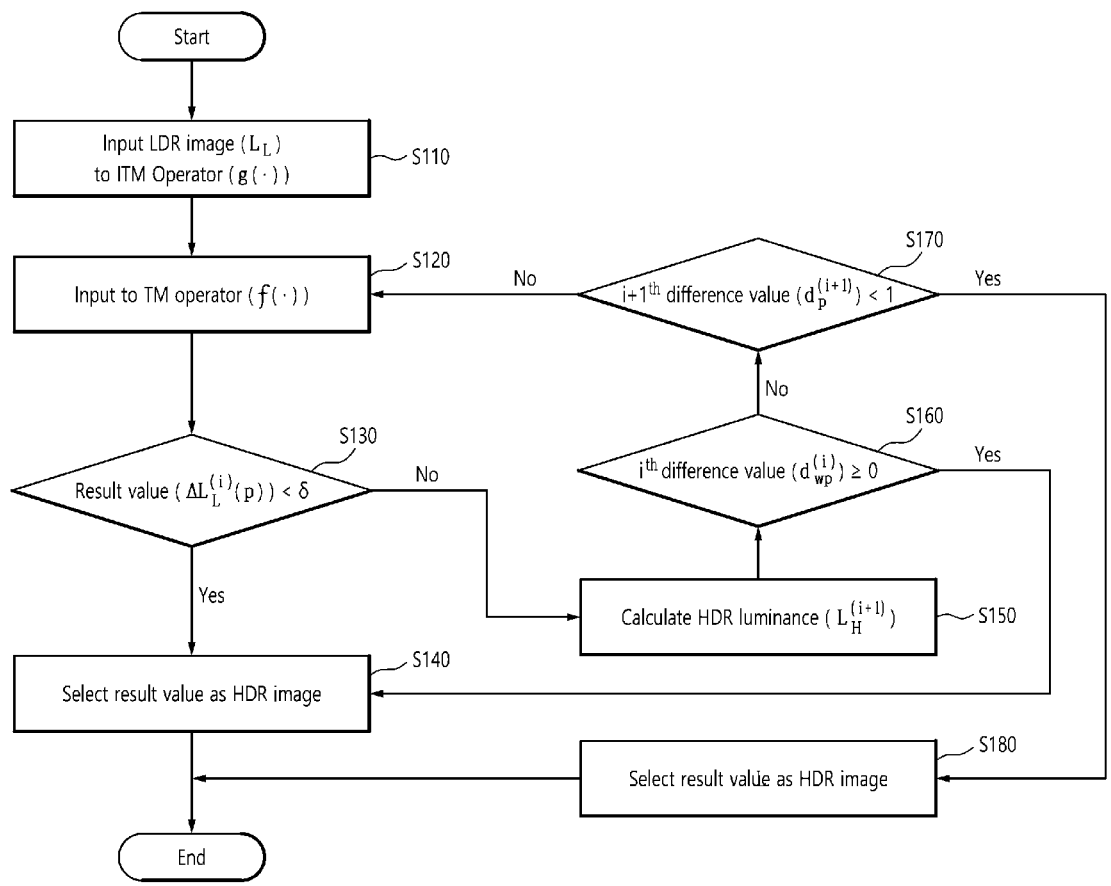
FIG. 2 is a flowchart illustrating a method for optimizing inverse tone mapping on basis of a single image according to an embodiment of the present disclosure.

FIG. 2 is a flowchart illustrating a method for optimizing inverse tone mapping on basis of a single image according to an embodiment of the present disclosure.

The present disclosure is aimed at acquiring an HDR image $L^*_H$ such that a tone mapped LDR image is the same as an input LDR image L defined in the spatial domain $\Omega$.

Referring to FIG. 2, the method for optimizing inverse tone mapping on basis of a single image according to an embodiment of the present disclosure first inputs a LDR image to ITM Operator $g(\cdot)$(S110).

To this end, a difference value $\Delta L_L^{(i)}$ between tone mapped luminance $L_L$ of $L_H^{(i)}$ at all pixels and $f(L_H^{(i)})$ is calculated using the ITM operator $g(\cdot)$ using the following Equation 7.

$$\Delta L_L^{(i)}(p) = f(L_H^{(i)}(p)) - L_L(p) \qquad \text{[Equation 7]}$$

Here, the initial HDR luminance $L_H^{(0)}$ is reconstructed from the input $L_L$, and the index i denotes $i^{th}$ iteration.

The result value by ITM operator according to S110 is inputted to TM operator (S120).

The result value by TM operator according to S120 is compared with the threshold for HDR luminance determination (S130).

In Equation 7, when $\Delta L_L^{(i)}(p)$ is smaller than the specific threshold $\delta$, $L^*_H(p) - L_H^{(i)}(p)$ is satisfied, and the result value by TM operator smaller than the threshold is selected as an HDR image (S140).

However, when $\Delta L_L^{(i)}(p)$ is equal to or larger than the specific threshold $\delta$, an updated predicted value may be acquired by calculating $i+1^{th}$ HDR luminance using a non-linear equation as shown in the following Equation 8 (S150).

$$f(L_H^{(i)}(p)) - L_L(p) = 0 \qquad \text{[Equation 8]))}$$

To find an optimal solution of Equation 8, the Newton-Raphson method (E. Reinhard, "Parameter estimation for photographic tone reproduction," J. Graphics Tools, vol. 7, no. 1, pp. 45-51, 2003) is used together with the initial HDR image $L_H^{(0)}$.

Additionally, the HDR luminance for each pixel at each iteration is expressed as the following Equation 9.

$$L_H^{(i+1)}(p) = L_H^{(i)}(p) - \frac{f(L_H^{(i)}(p)) - L_L(p)}{f'(L_H^{(i)}(p))} \qquad \text{[Equation 9]}$$

Since the calculation of $f'(\cdot)$ in Equation 9 is very complex, properties of a given inverse function are used in the following Equation 10.

$$f'(L_H^{(i)}(p)) = 1/g'(L_L^{(i)}(p)) \qquad \text{[Equation 10]}$$

The differentiation of $g(\cdot)$ in Equation 10 may find an approximate using a forward difference as shown in the following Equation 11.

$$g'(L_H^{(i)}(p)) \approx \frac{g(L_L^{(i)}(p) + h) - g(L_L^{(i)}(p))}{h} \qquad \text{[Equation 11]}$$

Here, h is the step size of the iteration process.

In general, the input LDR luminance is quantized into 256 discrete levels, and accordingly, in convergence, h should be equal to or smaller than 1.

When h=1, Equation 9 may be rewritten using Equation 10 and Equation 11 as shown in the following Equation 12.

$$L_H^{(i+1)}(p) = L_H^{(i)}(p) - g'(L_L^{(i)}(p))(f(L_H^{(i)}(p)) - L_L(p)) \qquad \text{[Equation 12]}$$

When the difference value for all pixels at $i^{th}$ iteration f of the result value acquired in the step S150 of acquiring the updated predicted value is smaller than 0 (No in S160) and the difference value at $i+1^{th}$ iteration is equal to or larger than 1 (No in S170), the difference value is substituted into an input value of the step S120 of inputting to TM operator.

In contrast, when the difference value for all pixels at $i^{th}$ iteration of the result value acquired in the step S150 of acquiring the updated predicted value is smaller than 0 (No in S160) and the difference value at i+1$^{th}$ iteration is smaller than 1 (Yes in S170), the difference value is selected as the HDR image (S180). That is, in Equation 12, where $d_p^{(i+1)}$<1, as shown in the following Equation 13, the iteration process ends and $L^*_H(p)–L_H^{(i+1)}(p)$ is set.

$$d_p^{(i+1)} = |f(L_H^{(i+1)}(p))–L_L(p)| \quad \text{[Equation 13]}$$

The Newton-Raphson method may not converge when the starting point is far away from the optimal solution.

In this case, the iteration process is terminated by the sum of differences $d_{wp}^{(i)}$ for all pixels calculated as shown in the following Equation 14.

$$d_{WP}^{(i)} = \Sigma_{p \in \cap} |f(L_H^{(i-1)}(p))–L_L(p)|–|f(L_H^{(i)}(p))–L_L(p)| \quad \text{[Equation 14]}$$

In case that the difference value for all pixels at i$^{th}$ iteration of the result value acquired in the step S150 of acquiring the updated predicted value is equal to or larger than 0, i.e., in Equation 14, where $d_{WP}^{(i)} \geq 0$ (Yes in S160), when the solution acquired at i$^{th}$ iteration for many pixels is found better than the solution calculated at i+1$^{th}$ iteration, Newton iteration $L_H^{(i)}(p)$ becomes the final solution of $L^*_H(p)$, and is substituted into an input value of the step S140 of selecting as the HDR image.

Figure 3:
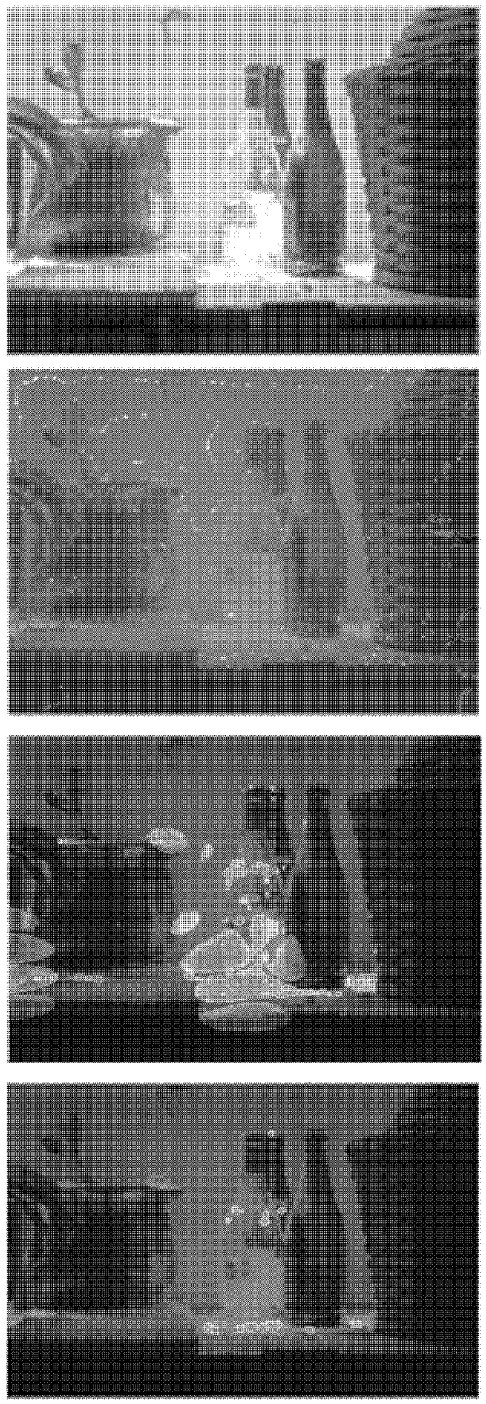
FIG. 3 is a diagram showing differences between a real High Dynamic Range (HDR) image and an intermediate HDR image using the present disclosure and an input Low Dynamic Range (LDR) image.

FIG. 3 shows differences between the real HDR image and the intermediate HDR image generated at 0th, fifth and last iterations using the present disclosure and the input LDR image.

The difference is measured using an HDR visual difference predictor (HDR-VDP2) (J. J. Mccann, "The Ansel Adams Zone System: HDR capture and range compression by chemical processing," IS&T/SPIE Electron. Imaging. Int. Soc. Opt. Photonics, vol. 7527, p. 75270S, February 2010) which is the commonly used matric for evaluation to compare original and reconstructed HDR images based on the human visual system.

A red pixel shows a difference between two images, while a blue pixel does not show a difference between images. These results show that a visible difference gradually decreases with the increasing number of iterations.

Figure 4:
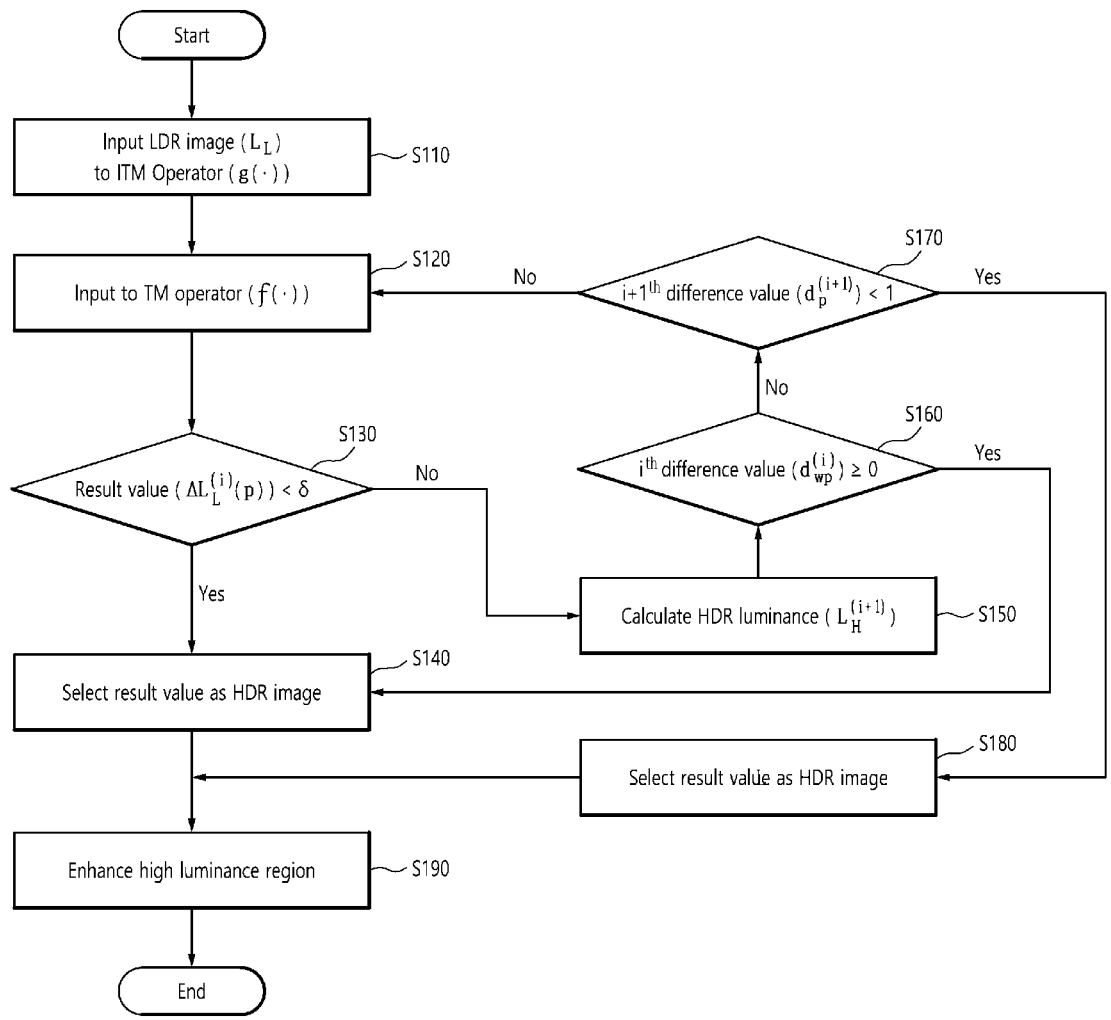
FIG. 4 is a flowchart illustrating a method for optimizing inverse tone mapping on basis of a single image according to another embodiment of the present disclosure.

FIG. 4 is a flowchart illustrating a method for optimizing inverse tone mapping on basis of a single image according to another embodiment of the present disclosure.

Referring to FIG. 4, the method for optimizing inverse tone mapping on basis of a single image according to another embodiment of the present disclosure further includes the step S190 of enhancing a high luminance region of the image selected in the step S140 of selecting as the HDR image described in FIG. 2.

In an embodiment, in the step S190 of enhancing the high luminance region, the high luminance region of the input LDR image having a larger luminance value of a pixel than the threshold for overexposure determination may be detected, and the input LDR image having the detected high luminance region may be processed.

In this instance, the processing of the input LDR image may be performed by acquiring a smoothed high luminance region, scaling the acquired smoothed high luminance region, and acquiring an output HDR image using the scaled high luminance region.

The method of performing each step will be described in detail as below.

To further enhance the high luminance region of the reconstructed HDR image, the high luminance region of the input LDR image having a larger pixel luminance value than the threshold $\delta_{OE}$ (Over Expose) is detected, and then the corresponding detected high luminance region is smoothed using a Cross Bilateral Filter.

Additionally, the pixel value of the high luminance region is acquired by scaling the input value $L^*_H$ of the HDR image according to the smoothed high luminance region.

Subsequently, the input LDR image L having the detected high luminance region S is considered.

The high luminance region is calculated at each location p as shown in the following Equation 15.

$$M(p) = \frac{1}{W(p)} \cdot \Sigma_{q \in N(p)} \exp\left(-\frac{\|p-q\|^2}{\sigma_2^2}\right) \exp\left(-\frac{\|L(p)-L(q)\|^2}{\sigma_r^2}\right) S(q) \quad \text{[Equation 15]}$$

Here, $$W(p) = \Sigma_{q \in N(p)} \exp\left(-\frac{\|p-q\|^2}{\sigma_2^2}\right) \exp\left(-\frac{\|L(p)-L(q)\|^2}{\sigma_r^2}\right),$$

and M is the smoothed high luminance region.

The parameter $\sigma_s$ is the standard deviation used to calculate a space (luminance) weight, the parameter $\sigma_r$ is the standard deviation used to calculate a range (luminance) weight, and N(p) is the neighborhood of p.

The present disclosure uses $\sigma_s=150$ and $\sigma_r=25$ (R. Kovaleski and M. M. Oliveira, "High-quality brightness enhancement functions for real-time reverse tone mapping," Vis. Comput., vol. 25, no. 5-7, pp. 539-547, May. 2009).

After a value of M is acquired, the value is scaled to a range [1 . . . α] using the following Equation 16.

$$\tilde{M}(p) = 1 + \frac{M(p) - M_{min}}{Mmin_{max}(p\ 1)} \quad \text{[Equation 16]}$$

Here, $\tilde{M}_\mu$ is the scaled value of M at location p, $M_{max}$ and $M_{min}$ are the maximum and minimum values of the smoothed high luminance region, and a value of a determines the degree of brightness amplification.

Finally, the output HDR image is acquired by pixel-by-pixel multiplication of the HDR image $L^*_H$ and the scaled value $\tilde{M}(p)$ of the smoothed high luminance region.

Hereinafter, the results of the method for optimizing inverse tone mapping on basis of a single image according to an embodiment of the present disclosure will be experimentally described.

The performance of the present disclosure may be compared with Banterle's method (L. Meylan, S. Daly, and S. Süsstrunk, "The reproduction of specular highlights on high dynamic range displays," Proc. Color Imaging Conf., vol. 2006, no. 1, pp. 333-338, January 2006), Huo's method (R. Kovaleski and M. M. Oliveira, "High-quality reverse tone mapping for a wide range of exposures", Proc. SIBGRAPI, pp. 49-56, August 2014) and Kovaleski's method (R. Kovaleski and M. M. Oliveira, "High-quality brightness enhancement functions for real-time reverse tone mapping," Vis. Comput., vol. 25, no. 5-7, pp. 539-547, May. 2009).

The method for optimizing inverse tone mapping on basis of a single image according to the present disclosure with or without post-processing is referred to as IITM and IITMPP respectively.

Prior to evaluation of the present disclosure, RGB color channels of the HDR image are restored as shown in the following Equation 17 according to (L. Meylan, S. Daly, and S. Süsstrunk, "The reproduction of specular highlights on high dynamic range displays," Proc. Color Imaging Conf., vol. 2006, no. 1, pp. 333-338, January 2006), (R. Mantiuk, K. J. Kim, A. G. Rempel, W. Heidrich, "HDR-VDP2: A calibrated visual metric for visibility and quality predictions in all luminance conditions," ACM Trans. Graph., vol. 30, no. 4, pp. 40-52, August 2011).

$$C_H = C_L\left(\frac{L_L}{L_H^4}\right) \quad \text{[Equation 17]}$$

Here, $C_L \in \{R_L, G_L, B_L\}$ and $C_H \in \{R_H, G_H, B_H\}$ denote the color channels of the input LDR image and the reconstructed HDR image respectively.

In the verification process of the present disclosure, $\epsilon = 10^{-6}$, $\delta = h = 1$, $\delta_{\cap R} = 254$, $\alpha = 4$, and $\tilde{L}_H^{max} = 20$ are set.

To acquire the parameter $\overline{L}_H$ of Reinhard's TM operator in the input LDR image, the input LDR image is linearized using the inverse gamma correction function of coefficient 2.2.

Since the log average of the linearized LDR image is close to the log average of the corresponding HDR image (F. Banterle, P. Ledda, K. Debattista, A. Chalmers, and M. Bloj, "A framework for inverse tone mapping," Vis. Comput.: Int. J. Comput. Graph., vol. 23, no. 7, pp. 467-478, July 2007), $\overline{L}_H$ is calculated by applying Equation 2 to the linearized LDR image.

In the verification process of the present disclosure, the maximum number of iterations is set to 300.

Additionally, it is found that underexposure (UE) and overexposure (OE) images generally need 0 to 100 iterations for the convergence.

A well exposed (WE) LDR image generally needs 100 to 300 iterations to acquire a final HDR image.

Since the present disclosure focuses on expanding the dynamic range of the luminance channel, color restoration does not reside in the scope of the present disclosure.

A test image is selected from MEF dataset including LDR images captured with different exposure times (K. Ma, K. Zeng, and Z. Wang, "Perceptual quality assessment for multi-exposure image fusion," IEEE Trans. Image Process., vol. 24, no. 11, pp. 3345-3356, November 2015).

For quantitative comparison, DRIM (T. O. Aydm, R. Mantiuk, K. Myszkowski, and H. Seidel, "Dynamic range independent image quality assessment," in Proc. Int. Conf. Comput. Graph. Interact. Tech., vol. 27, no. 3, pp. 1-69, August 2008) is used.

DRIM identifies a difference in contrast between the reference image and the test image. Additionally, the evaluation results are outputted as a distortion map which displays a contrast distortion error of each pixel in 3 colors, and red, green and blue represent contrast reversal (CR), contrast loss (CL) and contrast amplification (CA) respectively.

To quantify the DRIM results, the percentage of red, green and blue pixels is calculated.

According to (B. Masia, S. Agustin, R. W. Fleming, O. Sorkine, and D. Gutierrez, "Evaluation of reverse tone mapping through varying exposure conditions," ACM Trans. Graph., vol. 28, no. 5, pp. 160:1-160:8, 2009) and (R. Kovaleski and M. M. Oliveira, "High-quality reverse tone mapping for a wide range of exposures", Proc. SIBGRAPI, pp. 49-56, August 2014), CL and CR are undesirable.

In contrast, amplification of invisible contrast increases the perceived image quality for ITM operator.

Since the quality of the HDR image is related to the quality of the corresponding tone mapped LDR image (B. Masia, S. Agustin, R. W. Fleming, O. Sorkine, and D. Gutierrez, "Evaluation of reverse tone mapping through varying exposure conditions," ACM Trans. Graph., vol. 28, no. 5, pp. 160:1-160:8, 2009), the tone mapped LDR image of the reconstructed HDR image is acquired using Reinhard's TM operator (E. Reinhard, M. Stark, P. Shirley, and J. Ferwerda, "Photographic tone reproduction for digital images," ACM Trans. Graph., vol. 21, no. 3, pp. 267-276, July 2002).

Figure 5:
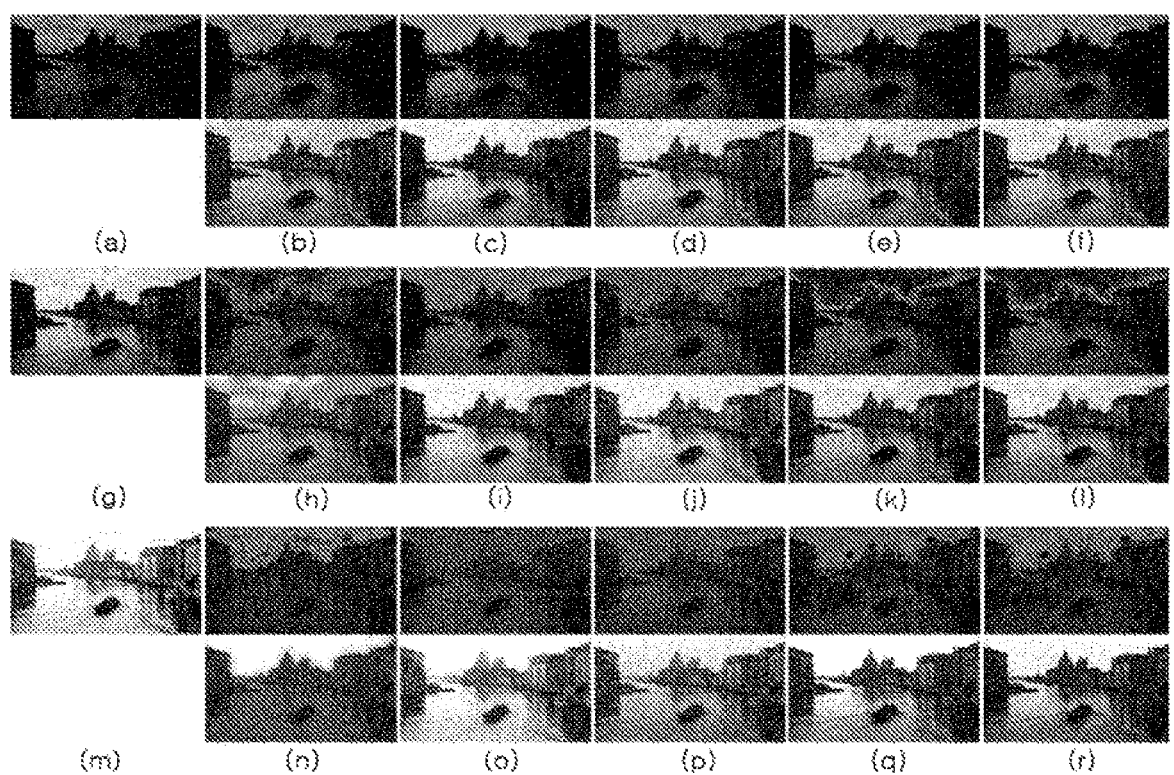
FIG. 5 is a diagram showing a comparison in DRIM results between the present disclosure and the existing methods.

(A) to (F) of FIG. 5 show the input UE LDR image, the DRIM results of the existing method and the present disclosure, and the tone mapped LDR image from the final HDR image of each ITM method.

The corresponding numerical DRIM results are listed in Table 1, and the best performance for CR, CL and CA is indicated in bold.

TABLE 1

| Method | UE (CL/CR/CA) | WE (CL/CR/CA) | OE (CL/CR/CA) |
|---|---|---|---|
| EM [4] | 0.077/0.186/0.450 | 0.142/0.276/0.219 | 0.024/0.122/0.102 |
| IRR [5] | 0.028/0.174/0.576 | 0.068/0.239/0.254 | 0.103/0.067/0.058 |
| HQBEF [6] | 0.086/0.191/0.446 | 0.144/0.224/0.147 | 0.059/0.055/0.035 |
| IITM | 0.012/0.134/0.518 | 0.016/0.122/0.452 | 0.014/0.085/0.313 |
| IITMPP | 0.012/0.134/0.518 | 0.016/0.122/0.452 | 0.016/0.109/0.372 |

(A) to (F) of FIG. 5 and Table 1 show a comparison of the DRIM results between the present disclosure and the existing methods, and the HDR image reconstructed according to the present disclosure has the lowest CL and CR and the HDR image reconstructed using IRR operator is the lowest.

The WE LDR images and the DRIM results of each method are shown in (G) to (L) of FIG. 5, and EM (F. Banterle, P. Ledda, K. Debattista, A. Chalmers, and M. Bloj, "A framework for inverse tone mapping," Vis. Comput.: Int. J. Comput. Graph., vol. 23, no. 7, pp. 467-478, July 2007) generates an HDR image having CL and CR in the sky as shown in (H) of FIG. 5.

The CR and CL may cause visual artifacts that can be seen in the corresponding tone mapping LDR image shown below the DRIM results, and the visual artifacts may be a factor that makes visual experience unpleasant.

Additionally, EM (F. Banterle, P. Ledda, K. Debattista, A. Chalmers, and M. Bloj, "A framework for inverse tone mapping," Vis. Comput.: Int. J. Comput. Graph., vol. 23, no. 7, pp. 467-478, July 2007) reconstructs an HDR image showing CR and CL in the high luminance region often having a thin structure.

The numerical results of Table 1 show that the HDR image reconstructed using IRR operator shows more CA than the HDR image reconstructed using HQBEF. However, IRR also causes high CR.

In (I) and (J) of FIG. 5, the green pixel of the sky region shows CL in the HDR images reconstructed using the two methods.

According to the numerical DRIM results of Table 1, the HDR image acquired according to the present disclosure shows much more CA, CR and CL than those acquired by the existing methods.

Since the high luminance region is not detected by thresholding, there is no difference in DRIM results between IITM and IITMPP.

The corresponding tone-mapped LDR image from the resultant HDR image of each ITM method is shown in the fourth row of FIG. 5.

According to the DRIM results, the proposed method achieves better local contrast in the sky region than the other methods.

The last two rows of FIG. 5 show the DRIM results of the OE LDR image and the corresponding LDR image.

As opposed to the UE and WE LDR images, the saturated sky region of the OE LDR image does not have texture and details as shown in (M) of FIG. 5.

EM (F. Banterle, P. Ledda, K. Debattista, A. Chalmers, and M. Bloj, "A framework for inverse tone mapping," Vis. Comput.: Int. J. Comput. Graph., vol. 23, no. 7, pp. 467-478, July 2007) generates an HDR image by CR around sharp edges since the Gaussian function cannot retain sharp edges as mentioned earlier.

CR and CL cause halo artifacts in the corresponding tone-mapped LDR image as shown in (N) of FIG. 5.

The comparison of the DRIM results in (O) to (R) of FIG. 5 shows that only the method according to the present disclosure enhances invisible contrast of the input LDR image. Additionally, there are less CR and CL around sharp edges.

The numerical DRIM results of IITM and IITMPP show that post-processing further expands the dynamic range of the saturated region, but it increases CR and CL.

Figure 6:
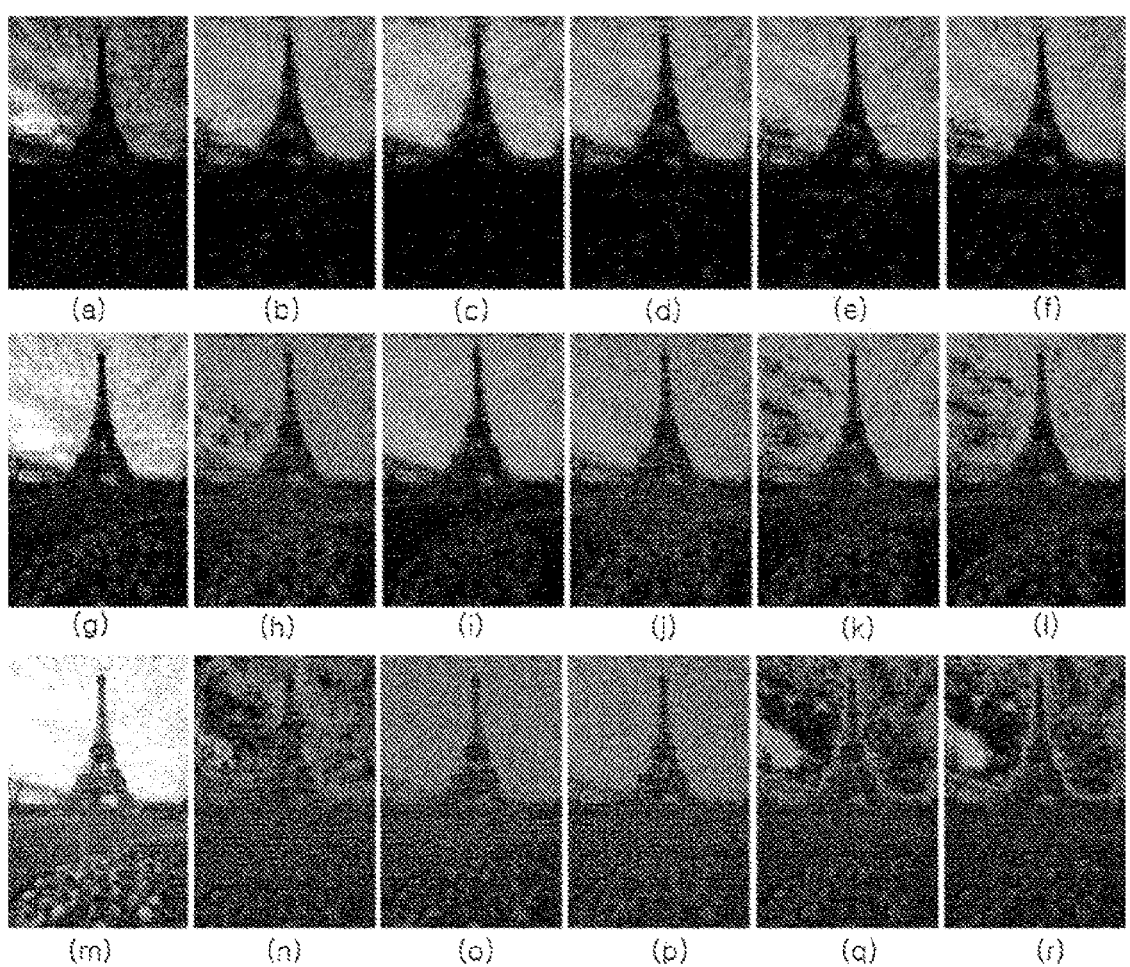
FIG. 6 is a diagram showing an outdoor scene captured with exposure times and DRIM results by inverse tone mapping (ITM) method.

FIG. 6 shows an outdoor scene captured with various exposure times and DRIM results by the ITM method.

Figure 7:
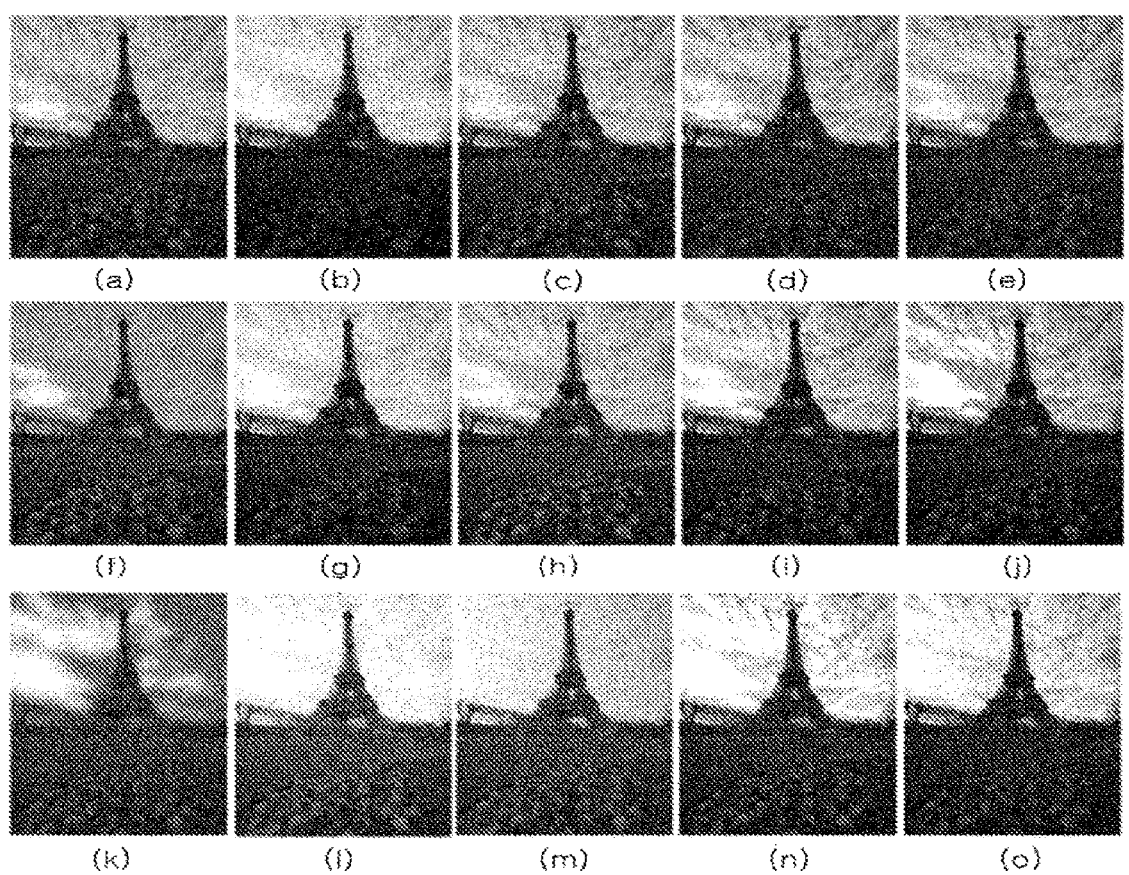
FIG. 7 is a diagram showing a tone mapped LDR image from an HDR image reconstructed by each ITM method.

FIG. 7 shows the tone mapped LDR image from the HDR image reconstructed by each ITM method.

Table 2 summarizes the numerical DRIM results.

TABLE 2

| Method | UE (CL/CR/CA) | WE (CL/CR/CA) | OE (CL/CR/CA) |
|---|---|---|---|
| EM [4] | 2.5/12.8/49.9 | 9.2/22.7/33.4 | 23/26.8/31.7 |
| IRR [5] | 9/13.1/53.3 | 39/18.6/40.3 | 13.8/12.1/13.4 |
| HQBEF [6] | 18/11.5/49.5 | 4.2/19.2/30.8 | 8.7/6.4/5.8 |
| IITM | 0.9/8/52.1 | 1.1/14.2/56.2 | 1.4/8.1/53 |
| IITMPP | 0.9/8/52.1 | 0.9/14.8/60.2 | 1.4/10.1/54.4 |

The input LDR image shown in FIG. 6 includes much more details and texture around the saturated region than the input LDR image shown in FIG. 5.

In the case of the UE image, the numerical DRIM results listed in Table 2 show that the HDR image reconstructed by the method according to the present disclosure shows less CR than the HDR images reconstructed by the other methods.

In the WE and OE LDR images of FIG. 6, EM (F. Banterle, P. Ledda, K. Debattista, A. Chalmers, and M. Bloj, "A framework for inverse tone mapping," Vis. Comput.: Int. J. Comput. Graph., vol. 23, no. 7, pp. 467-478, July 2007) introduces CL and CR into the sky region, and this is because the Gaussian function does not preserve the fine structure of the image and smooths the saturated region.

FIG. 6 and Table 2 show that since Cross Bilateral Filter preserves a thin structure better than Gaussian function, HQBEF (Y. Huo, F. Yang, L. Dong, and V. Brost, "Physiological inverse tone mapping based on retina response," The Visual Computer, Springer, vol. 30, no. 5, pp. 507-517, May. 2014)'s HDR image has less CL and CR than EM's one.

When comparing the DRIM results between IRR and HQBEF, it can be seen that HQBEF (R. Kovaleski and M. M. Oliveira, "High-quality reverse tone mapping for a wide range of exposures", Proc. SIBGRAPI, pp. 49-56, August 2014) is better than IRR in terms of CL and CR in the saturated region.

However, HQBEF efficiently expands the dynamic range of the saturated region, but the acquired CA is smaller in the non-saturated region than those of EM (F. Banterle, P. Ledda, K. Debattista, A. Chalmers, and M. Bloj, "A framework for inverse tone mapping," Vis. Comput.: Int. J. Comput. Graph., vol. 23, no. 7, pp. 467-478, July 2007) and IRR (L. Wang, L. Wei, K. Zhou, B. Guo, and H. Shum, "High dynamic range image hallucination," in Proc. Eurographics Symp. Rendering, pp. 321-326, June. 2007).

Since it is difficult to accurately predict the local adaptation level of the retina-response function at complex texture regions, IRR operator (Y. Huo, F. Yang, L. Dong, and V. Brost, "Physiological inverse tone mapping based on retina response," The Visual Computer, Springer, vol. 30, no. 5, pp. 507-517, May. 2014) always introduces CL, CR and CA into this region at the same time.

Additionally, there is a tendency to smooth the region of a very thin structure.

For example, the input LDR image shown in (M) of FIG. 6 includes a plurality of very thin structures in the sky region.

A large CL is introduced by IRR (L. Wang, L. Wei, K. Zhou, B. Guo, and H. Shum, "High dynamic range image hallucination," in Proc. Eurographics Symp. Rendering, pp. 321-326, June. 2007), and this can be seen from a comparison between the corresponding tone mapped LDR image and the input OE LDR image.

The DRIM results show that the HDR image reconstructed according to the present disclosure has more CA and less CA and CR than the reconstructed ones by the other methods.

Additionally, FIG. 7 shows that the tone-mapped LDR image according to the present disclosure outperforms the tone-map images according to the existing methods in terms of local and global contrast.

These results show that a high quality HDR image can be acquired by minimizing a difference between the corresponding tone mapped LDR image and the input LDR image.

Additionally, post-processing may further enhance the contrast of the high luminance region.

Figure 8:
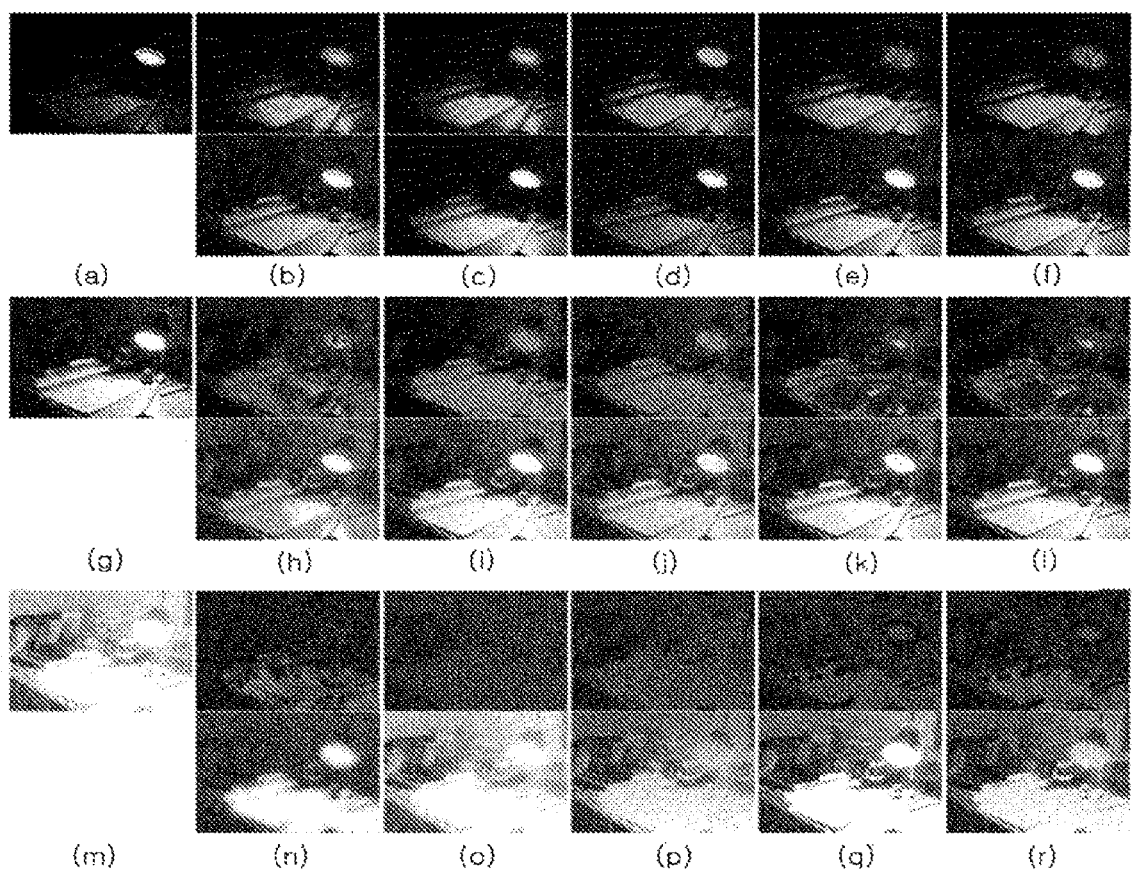
FIG. 8 is a diagram showing an indoor scene captured with exposure times together with each ITM method and DRUM results of the corresponding tone mapped HDR image.

FIG. 8 shows an indoor scene captured with various exposure times together with each ITM method and the DRUM results of the corresponding tone mapping HDR image, and the numerical results are summarized in Table 3.

TABLE 3

| Method | UE (CL/CR/CA) | WE (CL/CR/CA) | OE (CL/CR/CA) |
|---|---|---|---|
| EM [4] | 0.018/0.080/ 0.790 | 0.112/0.109/ 0.374 | 0.224/0.112/ 0.306 |
| IRR [5] | 0.005/0.085/ 0.851 | 0.051/0.067/ 0.511 | 0.072/ 0.009/ 0.003 |
| HQBEF [6] | 0.016/0.072/ 0.787 | 0.041/0.056/ 0.305 | 0.043/0.038/ 0.012 |

TABLE 3-continued

| Method | UE (CL/CR/CA) | WE (CL/CR/CA) | OE (CL/CR/CA) |
|---|---|---|---|
| IITM | 0.004/0.059/0.835 | 0.007/0.073/0.640 | 0.008/0.016/0.349 |
| IITMPP | 0.004/0.059/0.835 | 0.007/0.086/0.653 | 0.0078/0.027/0.481 |

In terms of CL, CR and CA, the best performance is indicated in bold, and when compared with the input LDR image shown in FIGS. 5 and 6, the indoor image includes not only less sharp edges but also less texture and details in the high luminance region.

In the WE and OE images, excellent performance is achieved in terms of CA indicated by the blue pixel in the DRIM results according to the present disclosure.

With regard to the OE image shown in (M) of FIG. 8, only the method according to the present disclosure efficiently expands the dynamic range without introducing CL and CR.

The numerical DRIM results acquired for all the input images show that the ITM method according to the present disclosure expands the dynamic range of the LDR image and effectively minimizes CR and CL. Additionally, the method according to the present disclosure provides good performance for the WE image.

The term 'unit' used in the above embodiments refers to a software or hardware component such as field programmable gate array (FPGA) or ASIC, and the 'unit' plays roles. However, the 'unit' is not limited to software or hardware. The 'unit' may be configured to be in an addressable storage medium and operate one or more processors. Accordingly, the 'unit' includes, for example, components such as software components, object oriented software components, class components and task components, processes, functions, attributes, procedures, subroutines, segments of program patent code, drivers, firmware, microcode, circuits, data, database, data structures, tables, arrays and parameters. The function provided in the components and the 'units' may be assembled into a smaller number of components and 'units' or separated from additional components and 'units'. In addition, the components and 'units' may be configured to operate one or more CPUs in a device or a secure multimedia card.

The method for optimizing inverse tone mapping on basis of a single image according to an embodiment described through FIG. 2 or 4 may be implemented in the form of a computer-readable medium which stores instructions and data that is capable of being executed by a computer. In this instance, the instructions and data may be stored in the format of program code, and when executed by the processor, may generate a predetermined program module to perform a predetermined operation. Additionally, the computer-readable medium may be any available medium that is accessible by the computer, and includes volatile and non-volatile media and removable and non-removable media. Additionally, the computer-readable medium may be a computer recording medium, and the computer recording medium may include volatile and nonvolatile, removable and non-removable media implemented by any method or technology to store information such as computer-readable instructions, data structure, a program module or other data. For example, the computer recording medium may be a magnetic storage medium such as HDD and SSD, an optical recording medium such as CD, DVD and blu-ray disc, or memory included in a server that is accessible via a network.

Additionally, the method for optimizing inverse tone mapping on basis of a single image according to an embodiment described through FIG. 2 or 4 may be implemented in a computer program (or a computer program product) including computer-executable instructions. The computer program includes programmable machine language instructions that are processed by the processor, and may be written in High-level Programming Language, Object-oriented Programming Language, assembly language or machine language. Additionally, the computer program may be recorded in a tangible computer-readable recording medium (for example, memory, hard disk, magnetic/optical media or Solid-State Drive (SSD), etc.).

Accordingly, the method for optimizing inverse tone mapping on basis of a single image according to an embodiment described through FIG. 2 or 4 may be implemented when the computer program as described above is executed by a computing device. The computing device may include at least some of a processor, memory, a storage device, high-speed interface connected to the memory and a high-speed expansion port, and low-speed interface connected to a low-speed bus and the storage device. Each of the components may be connected to each other using a variety of buses, and may be mounted on a common motherboard or by any appropriate method.

Here, the processor may process the instructions in the computing device, and the instructions may be, for example, instructions stored in the memory or storage device to display graphic information for providing Graphic User Interface (GUI) onto an external I/O device such as a display accessed to the high-speed interface. As another example, a plurality of processors and (or) a plurality of buses may be appropriately used together with a plurality of memory and memory array. Additionally, the processor may be implemented as a chipset consisting of chips including a plurality of standalone analog and (or) digital processors.

Additionally, the memory stores information in the computing device. In an example, the memory may include a volatile memory unit or a set of volatile memory units. In another example, the memory may include a nonvolatile memory unit or a set of nonvolatile memory units. Additionally, the memory may be, for example, a different type of computer-readable medium such as magnetic or optical disk.

Additionally, the storage device may provide a high capacity storage space to the computing device. The storage device may be a computer-readable medium or include the medium, and for example, the storage device may include, devices in Storage Area Network (SAN) or other components, and may be floppy disk, hard disk, optical disk, or tapes, flash memory, any other analogous semiconductor memory or memory array.

It will be understood by those having ordinary skill in the technical field pertaining to the above-described embodiments that the above-described embodiments are provided for illustration, and may be easily modified into other forms without changing the technical spirit or essential features of the above-described embodiments. Accordingly, it should be understood that the above-described embodiments are illustrative and not limitative in all aspects. For example, each component described as a single component may be performed in a distributed manner, and likewise, components described as distributed may be performed in an assembled manner.

The scope sought to be protected through the specification is defined in the appended claims rather than the above detailed description, and should be interpreted as including all changes or modifications derived from the meaning of the appended claims and the scope of the appended claims and its equivalent concept.

The invention claimed is:

1. A method for optimizing inverse tone mapping on basis of a single image, comprising:
inputting a Low Dynamic Range (LDR) image to Inverse Tone Mapping (ITM) operator;
inputting a result value by the ITM operator to Tone Mapping (TM) operator;
comparing a result value by the TM operator with a threshold for HDR luminance determination; and
selecting the result value by the TM operator which is smaller than the threshold as a High Dynamic Range (HDR) image,
wherein the method further comprises acquiring an updated predicted value by calculating i+1$^{th}$ HDR luminance when the result value by the TM operator is equal to or larger than the threshold.

2. The method for optimizing inverse tone mapping on basis of a single image according to claim 1, wherein when a difference value for all pixels at ith iteration of a result value acquired in the step of acquiring the updated predicted value is equal to or larger than 0, the difference value is substituted into an input value of the step of selecting as the HDR image.

3. The method for optimizing inverse tone mapping on basis of a single image according to claim 1, wherein when a difference value for all pixels at ith iteration of a result value acquired in the step of acquiring the updated predicted value is smaller than 0 and a difference value at i+1$^{th}$ iteration is equal to or larger than 1, the difference value is substituted into an input value of the step of inputting to the TM operator.

4. The method for optimizing inverse tone mapping on basis of a single image according to claim 1, wherein when a difference value for all pixels at ith iteration of a result value acquired in the step of acquiring the updated predicted value is smaller than 0 and a difference value at i+1$^{th}$ iteration is smaller than 1, a luminance value at the i+1$^{th}$ iteration is substituted into an input value of the step of selecting as the HDR image.

5. The method for optimizing inverse tone mapping on basis of a single image according to claim 1, further comprising:
enhancing a high luminance region of the image selected in the step of selecting as the HDR image.

6. The method for optimizing inverse tone mapping on basis of a single image according to claim 5, wherein enhancing the high luminance region comprises:
detecting the high luminance region of the input LDR image having a larger luminance value of a pixel than the threshold for overexposure determination; and
processing the input LDR image having the detected high luminance region.

7. The method for optimizing inverse tone mapping on basis of a single image according to claim 6, wherein detecting the high luminance region comprises smoothing the detected high luminance region using a cross bilateral filter.

8. The method for optimizing inverse tone mapping on basis of a single image according to claim 7, wherein a pixel value of the high luminance region is acquired by scaling an input value of the HDR image according to the smoothed high luminance region.

9. The method for optimizing inverse tone mapping on basis of a single image according to claim 6, wherein processing the input LDR image comprises:
acquiring a smoothed high luminance region;
scaling the acquired smoothed high luminance region; and
acquiring an output HDR image using the scaled high luminance region.

10. The method for optimizing inverse tone mapping on basis of a single image according to claim 9, wherein acquiring the smoothed high luminance region comprises:
acquiring the smoothed high luminance region (M(p)) by calculating at each location p by the following equation:

$$M(p) = \frac{1}{W(p)} \sum_{q \in N(p)} \exp\left(-\frac{\|p-q\|^2}{\sigma_s^2}\right) \exp\left(-\frac{\|L(p)-L(q)\|^2}{\sigma_r^2}\right) S(q)$$

where $$W(p) = \sum_{q \in N(p)} \exp\left(-\frac{\|p-q\|^2}{\sigma_s^2}\right) \exp\left(-\frac{\|L(p)-L(q)\|^2}{\sigma_r^2}\right),$$

where
$\sigma_s$ is a standard deviation used to calculate a space (luminance) weight, $\sigma_r$ is a standard deviation used to calculate a range (luminance) weight, and N(p) is a neighborhood of p.

11. The method for optimizing inverse tone mapping on basis of a single image according to claim 9, wherein the scaling comprises scaling the smoothed high luminance region (M(p)) acquired in the step of acquiring the smoothed high luminance region to a range [1 to α] using the following equation:

$$\tilde{M}(p) = 1 + \frac{M(p) - M_{min}}{Mmin_{max}(\alpha - 1)}$$

where ($\tilde{M}(p)$) is a scaled value of the smoothed luminance region (M) at location p, is a maximum value of the smoothed high luminance region, and is a Mmin$_{max}$ is a minimum value of the smoothed high luminance region.

12. The method for optimizing inverse tone mapping on basis of a single image according to claim 9, wherein acquiring the output HDR image comprises acquiring the output HDR image by pixel-by-pixel multiplication of the HDR image (L*$_H$) and a scaled value ($\tilde{M}(p)$) of the smoothed high luminance region.

13. A non-transitory computer-readable recording medium having recorded thereon a computer program for performing the method for optimizing inverse tone mapping on basis of a single image according to claim 1.

14. An apparatus for optimizing inverse tone mapping on basis of a single image, comprising:
an Inverse Tone Mapping (ITM) computer to input a Low Dynamic Range (LDR) image to an ITM operator;
a Tone Mapping (TM) computer to input a result value by the ITM operator to a TM operator;
a threshold comparator to compare a result value by the TM operator with a threshold for a High Dynamic Range (HDR) luminance determination; and
a (HDR image selector to select the result value by the TM operator as an HDR image when it is determined by the threshold comparator that the result value by the TM operator is smaller than the threshold, wherein an updated predicted value is acquired by calculating i+1$^{th}$ HDR luminance when the result value by the TM operator is equal to or larger than the threshold.

* * * * *